(12) United States Patent
Kang et al.

(10) Patent No.: US 8,539,212 B1
(45) Date of Patent: *Sep. 17, 2013

(54) DETERMINATIVE BRANCH PREDICTION INDEXING

(75) Inventors: Jack Kang, Sunnyvale, CA (US); Yu-Chi Chuang, Jhubei (TW)

(73) Assignee: Marvell International Ltd., Hamilton (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,837

(22) Filed: Aug. 31, 2012

Related U.S. Application Data

(63) Continuation of application No. 12/100,144, filed on Apr. 9, 2008, now Pat. No. 8,261,049, which is a continuation-in-part of application No. 11/775,172, filed on Jul. 9, 2007, now Pat. No. 8,046,775.

(60) Provisional application No. 60/911,071, filed on Apr. 10, 2007.

(51) Int. Cl.
*G06F 9/30* (2006.01)

(52) U.S. Cl.
USPC .............................................. 712/239

(58) Field of Classification Search
USPC .............................................. 712/239
See application file for complete search history.

(56) References Cited

U.S. PATENT DOCUMENTS

| | | | |
|---|---|---|---|
| 6,295,600 B1 | 9/2001 | Parady | |
| 6,366,761 B1 | 4/2002 | Montpetit | |
| 6,801,997 B2 | 10/2004 | Joy et al. | |
| 6,823,516 B1 | 11/2004 | Cooper | |
| 7,107,363 B2 | 9/2006 | Brown et al. | |
| 7,213,084 B2 | 5/2007 | Ogilvie et | |
| 7,213,137 B2 | 5/2007 | Boom et al | |
| 7,360,064 B1 | 4/2008 | Steiss et al. | |
| 7,430,221 B1 | 9/2008 | Kovacs et al. | |
| 7,434,037 B2 | 10/2008 | Park et al. | |
| 7,472,393 B2 | 12/2008 | Ballantyne | |
| 7,564,872 B1 | 7/2009 | Chawla et al. | |
| 7,676,660 B2 | 3/2010 | Kissell | |
| 7,694,304 B2 | 4/2010 | Kissell | |
| 7,761,697 B1 | 7/2010 | Coon et al. | |
| 2002/0103990 A1 | 8/2002 | Potash | |
| 2003/0023835 A1 | 1/2003 | Kalafatis et al. | |
| 2004/0073735 A1 | 4/2004 | Boom et al. | |
| 2004/0148606 A1 | 7/2004 | Hosoe | |
| 2004/0215720 A1 | 10/2004 | Alexander et al. | |
| 2005/0050305 A1 | 3/2005 | Kissell | |
| 2006/0179281 A1 | 8/2006 | Jensen et al. | |
| 2006/0288190 A1 | 12/2006 | Shoemaker | |
| 2007/0174372 A1 | 7/2007 | Feghali et al. | |
| 2007/0204137 A1 | 8/2007 | Tran | |
| 2008/0229068 A1 | 9/2008 | Bose et al. | |

OTHER PUBLICATIONS

Matz, Kevin. "Calling Interrupts". 1997, pp. 1-7.
Steere et al., "A Feedback-driven Proportion Allocator for Real-Rate Scheduling," Proceedings of the 3rd Symposium on Operating System Design and Implementation, New Orleans, Louisiana, Feb. 1999, pp. 1-15.

*Primary Examiner* — Robert Fennema

(57) ABSTRACT

Systems, apparatuses, and methods for determinative branch prediction indexing are described herein. The determinative branch prediction indexing method includes receiving a program counter address for a branch instruction, dynamically selecting a branch indexing scheme from a plurality of branch indexing schemes, and generating a branch prediction index based at least in part on selected branch indexing scheme and the program counter address. Other embodiments may be described and claimed.

15 Claims, 5 Drawing Sheets

| Index | Branch history |
|---|---|
| Br1 | (n) – 1; (n-1) – 0; ... (1) - 1 |
| Br2 | (m) – 0; (m-1) – 0; ... (1) - 1 |
| ... | |

DETERMINATIVE BRANCH PREDICTION INDEXING

CROSS-REFERENCES TO RELATED APPLICATIONS

The present disclosure is a continuation of and claims priority to U.S. patent application Ser. No. 12/100,144, filed on Apr. 9, 2008, now U.S. Pat. No. 8,261,049, issued Sep. 4, 2012, which claims priority to and is a Continuation-in-Part of U.S. patent application Ser. No. 11/775,172, filed on Jul. 9, 2007, now U.S. Pat. No. 8,046,775, issued Oct. 25, 2011, which claims priority to and is a non-provisional application of U.S. Provisional Application No. 60/911,071, filed on Apr. 10, 2007, which is incorporated herein by reference.

TECHNICAL FIELD

Embodiments of the present invention relate to the field of computer processing and, in particular, to techniques for determinative branch prediction indexing.

BACKGROUND

Many modern computer architectures include a branch predictor that, in the event of a branch instruction, predicts which branch will be taken and speculatively fetches and executes instructions without having to wait until the branch is resolved.

In current branch prediction schemes lower bits of a program counter (PC) are used to index branch prediction entries stored in a branch prediction table. This means that if multiple branches have the same lower address, they will share the same branch prediction entry. This may be referred to as aliasing.

In a multi-threaded system, aliasing may be more prevalent due to multiple threads sharing the same branch predictor. This may easily happen if, for example, two threads are sharing the same code section.

In order to prevent this, one method may be to use a thread tag, which identifies the thread associated with an instruction, as one of the index bits for the branch history table. One drawback of this method, however, is the cost of such an approach: each thread now has an equally sized branch prediction table, with no regard to the bandwidth requirement of each thread and/or the code size of the thread.

SUMMARY OF THE INVENTION

An advantage of the present invention is to provide an efficient indexing scheme for storage and access of branch history information. In some embodiments, a computing system is described with a branch predictor providing determinative branch prediction indexing.

More specifically, there is provided, in accordance with various embodiments of the present invention, a method for receiving an address of a branch instruction from a program counter, dynamically selecting a branch indexing scheme from a plurality of branch indexing schemes, and generating a branch prediction index based on the selected branch indexing scheme and the received address. In some embodiments, the branch prediction index may include selected lower bits of the program counter address and in other embodiments, the branch prediction index may include selected upper bits of the program counter.

In various embodiments, the branch prediction index may be further based on a received thread tag that identifies a thread to which the branch instruction is associated.

In various embodiments, the method may include determining a state of a host system on which the branch instruction is executing and dynamically selecting the branch indexing scheme based at least in part on the determined state of the system. The state of the system may be determined by determining locations in memory where a plurality of active threads reside, the plurality of active threads including a thread associated with the branch instruction.

Various embodiments of the present invention include an apparatus providing a processing environment in a host system. The apparatus may have a program counter configured to store an address of a branch instruction and a branch predictor communicatively coupled to the program counter. The branch predictor may have a controller configured to select a branch indexing scheme from a plurality of branch indexing schemes and an indexer communicatively coupled to the controller to receive the branch indexing scheme and to generate a branch prediction index based at least in part on the branch indexing scheme and the address.

In various embodiments, the controller may determine a state of the host, e.g., locations in memory where threads are located, and select the branch indexing scheme based on the state of the host.

In various embodiments, the apparatus may also include an instruction cache configured to store the branch instruction and a thread tag identifying a thread with which the branch instruction is associated. The indexer further may additionally use the thread tag in the generation of the branch prediction index.

In various embodiments, the apparatus may also have a branch prediction table to store a branch prediction index and branch history of the branch instruction.

Additional embodiments of the present invention include an apparatus providing a processing environment in a host system. The apparatus may have means for receiving an address of a branch instruction from a program counter, means for selecting a branch indexing scheme from a plurality of branch indexing schemes, and means for generating a branch prediction index based at least in part on selected branch indexing scheme and the received address.

In various embodiments, the apparatus may have means for receiving a thread tag identifying a thread to which the branch instruction is associated. The thread tag may be used in generation of the branch prediction index.

In various embodiments, the apparatus may have means for determining a state of the host system, e.g., locations in memory where a plurality of active threads reside. The branch indexing scheme may be selected based on the determined state of the host.

Various embodiments of the present invention may include a machine-accessible medium having associated instructions, which, when accessed, results in a machine receiving an address of a branch instruction from a program counter, selecting a branch indexing scheme from a plurality of branch indexing schemes, and generating a branch prediction index based on selected branch indexing scheme and the received address.

In various embodiments, the instructions with the machine-accessible medium may, when accessed, further result in the machine receiving a thread tag identifying a thread with which the branch instruction is associated and generating the branch prediction index based at least in part on the received thread tag.

In various embodiments, the instructions with the machine-accessible medium may, when accessed, further result in the machine determining a state of the machine, e.g., by determining locations in memory where a plurality of active threads reside, and selecting the branch indexing scheme based on the determined state of the machine.

In various embodiments, a host system hosting apparatuses described herein may also be described and claimed. The system may include a memory configured to store a plurality of threads including a thread having a branch instruction and a processor communicatively coupled to the memory and configured to execute the plurality of threads. The processor may have a program counter configured to store an address of the branch instruction and a branch predictor communicatively coupled to the program counter. The branch predictor may include a controller configured to select a branch indexing scheme from a plurality of branch indexing schemes and an indexer communicatively coupled to the controller to receive the branch indexing scheme and to generate a branch prediction index based at least in part on the branch indexing scheme and the address. The controller may determine the state of the system, e.g., location in memory of the plurality of threads, and select the branch indexing scheme based on the system state.

The processor may include an instruction cache and the indexer may additionally use a thread tag, stored with the branch instruction in the instruction cache, in the generation of the branch prediction index.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Certain embodiments may describe methods by reference to flow diagrams to enable one skilled in the art to develop programs including instructions to carry out the methods on suitably configured processing devices, such as a multi-thread processor of a computing system executing the instruction execution threads from machine-accessible media. The computer-executable instructions may be written in a computer programming language or may be embodied in firmware logic. If written in a programming language conforming to a recognized standard, such instructions may be executed on a variety of hardware platforms and for interface to a variety of operating systems, such as multi-thread aware and non-multi-thread aware operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application . . . ), as taking an action or causing a result. Such expressions are merely a shorthand way of saying that execution of the software by a device causes the processor of the computer to perform an action or produce a result.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
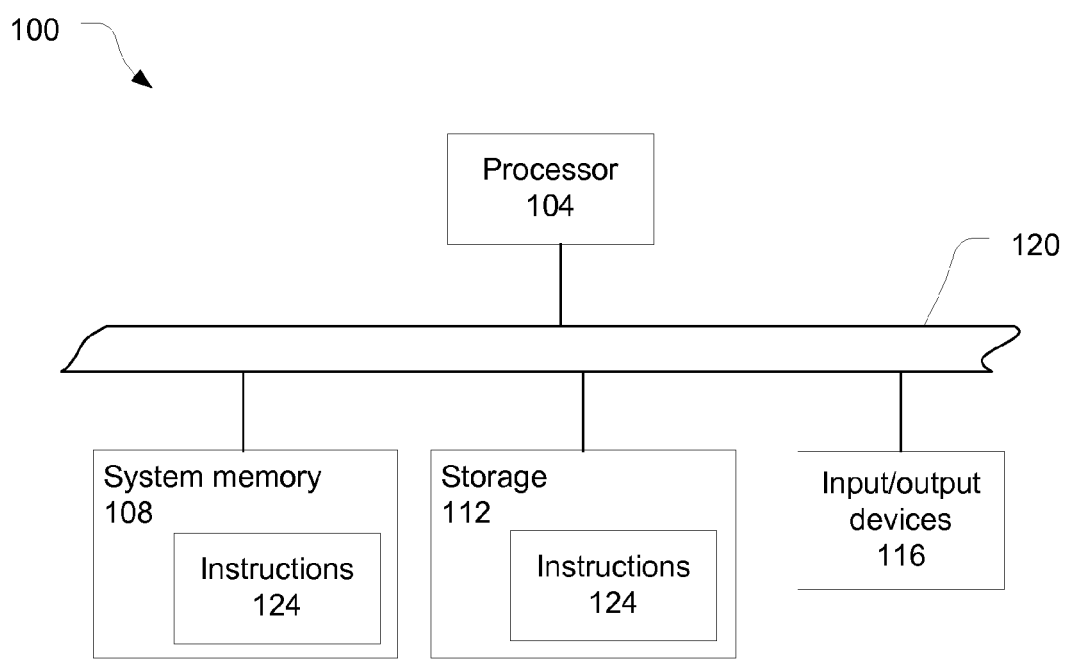
FIG. 1 is a block diagram of a host system, in accordance with at least one embodiment of the present invention.

FIG. 1 illustrates a computing system 100 capable of implementing determinative branch prediction indexing in accordance with various embodiments of the present invention. Computing system 100 may have a processor 104, system memory 108, storage 112, and input/output devices 116 coupled to one another by one or more buses 120 as shown.

The input/output devices 116 may include peripheral devices, e.g., keyboard, cursor control, temperature sensors, power supplies, etc., as well as communication interfaces, e.g., network interface cards, modems, etc.

System memory 108 and storage 112 may be employed to store a working copy and a permanent copy of programming instructions implementing various system services and applications, collectively denoted as instructions 124. The permanent copy of the programming instructions may be placed into storage 112 in the factory, or in the field, through, for example, a distribution medium (not shown), such as a compact disc (CD), or through a communication interface of the input/output devices 116 (from a distribution server (not shown)). A distribution CD may include all or portions of the implementing instructions.

The instructions 124 may include a number of threads of execution instructions. In some embodiments, the processor 104 may be a multi-thread processor having one or more processing cores capable of executing some of the threads in parallel.

The instructions 124 may include numerous conditional branch instructions. When the processor 104 executes a conditional branch instruction (hereinafter "branch instruction") it may determine the likelihood that the branch will be taken based on the branch history, i.e., whether the branch has been taken in the past. The branch history may be stored as a number of entries in one or more branch history tables, which may be accessed by a branch prediction index. A branch prediction index may be derived according to a branch indexing scheme by using the address of the branch instruction and/or thread tag information that identifies the thread to which the instruction is associated. In various embodiments, the processor 104 may use determinative branch prediction indexing to more efficiently organize and, subsequently, access this branch history in these branch tables.

As used herein, determinative branch prediction indexing may refer to the use of a branch indexing scheme, selected from a plurality of available branch indexing schemes, based on a state of the computing system 100. In various embodiments, the selected branch indexing scheme may be dynamically selected from the available schemes, i.e., selected while the computing system 100 is operating.

Figure 2:
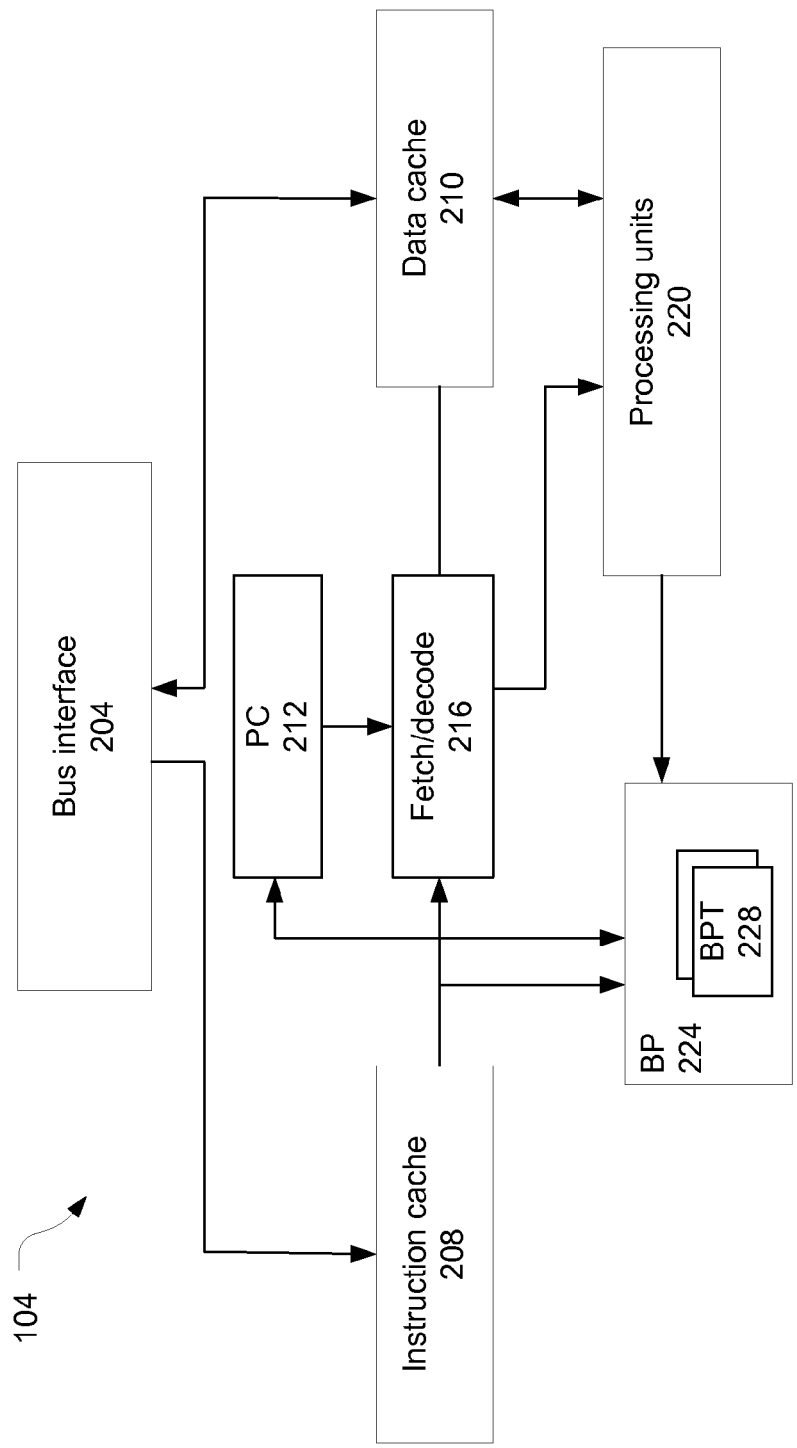
FIG. 2 is a block diagram of a processor, in accordance with various embodiments of the present invention.

FIG. 2 illustrates the processor 104 in more detail in accordance with various embodiments of the present invention. The processor 104 may be communicatively coupled to the other components of the computing system 100 through a bus interface 204. The bus interface 204 may direct incoming program code, e.g., instructions, to an instruction cache 208 and data to be used by the code to a data cache 210. A fetch and decode (fetch/decode) block 216 may pull instructions from the instruction cache 208, decode the instructions, and provide the decoded instructions to processing units 220 for execution.

The processing units 220 may include various execution circuitry including, e.g., an arithmetic logic unit (ALU), a floating point unit, jump execution unit, retirement unit, reorder buffer (ROB), store buffer, etc. After the processing units 220 execute the instructions, the resulting data may be placed in the data cache 210 and transferred to the other components of the computing system 100 through the bus interface 204.

A program counter 212 may be a register in the processor 104 indicating an address of an instruction that is currently executing or that is the next to execute. The program counter 212 may have the same number of bits as an address bus of the computing system 100. The program counter 212 may sequentially increment following most instructions. However, after certain instructions are executed, e.g., branch instructions, the program counter 212 may be advanced to a non-sequential address determined by a branch predictor 224 of the processor 104.

The branch predictor 224 may receive the instructions being provided to the fetch/decode block 216 and/or the value of the program counter 212. When a branch instruction is received, the branch predictor 224 may access branch history stored in branch prediction tables 228 and predict whether or not the branch will be taken. If the branch predictor 224 predicts the branch will be taken, the address of the instruction associated with the branch may be provided to the program counter 212. If the branch predictor 224 predicts the branch will not be taken, the program counter 212 may be sequentially incremented.

After a branch instruction is executed by the processing units 220, the branch predictor 224 may receive feedback from the processing units 220 to determine whether the branch was actually taken or not. This information may be added to the branch prediction tables 228 for later reference. If the branch was predicted successfully, the next instruction may already be in the pipeline for execution. If the branch prediction was incorrect, the correct instruction may be retrieved.

Figure 3:
FIG. 3 illustrates a branch prediction table, in accordance with various embodiments of the present invention.

FIG. 3 illustrates an example of branch prediction table 300 that may be found in branch prediction tables 228 in accordance with various embodiments of the present invention. As shown, table 300 includes entries for a first branch instruction having an index (Br1) and a second branch instruction having an index (Br2). The indices Br1 and Br2 may be, e.g., 10-bit indices. The branch history of the first branch instruction may be that when the branch instruction occurred n-times ago the branch was taken (represented by 1), (n−1)-times ago the branch was not taken (represented by 0), and so on until the last time the first branch instruction occurred, in which the branch was taken. The branch history of the second branch instruction may be that m-times ago the branch was not taken, (m−1)-times ago the branch was not taken, and so on until the last time that the second branch instruction occurred, in which the branch was taken.

In other embodiments, branch indexing tables may include other types of branch history information. For example, there may be a counter that increments up or down based on whether the last branch was taken or not. In a two-bit counter, a zero or one may indicate that the next branch should be "not taken" while a two or three may indicate that the next branch should be "taken." Whenever a branch is encountered, this counter may be updated as appropriate.

Figure 4:
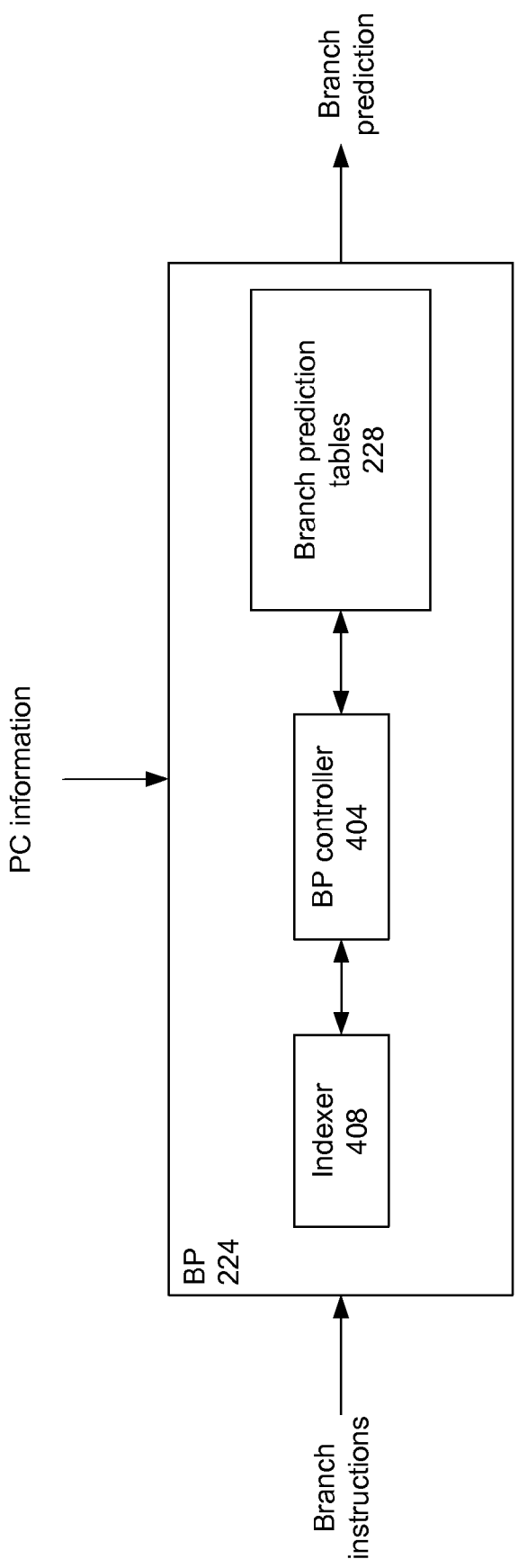
FIG. 4 is a block diagram of a branch predictor, in accordance with various embodiments of the present invention.

FIG. 4 illustrates the branch predictor 224 in accordance with various embodiments of the present invention. The branch predictor 224 may include a controller 404 and an indexer 408 communicatively coupled to one another and to the branch prediction tables 228 at least as shown.

When a branch instruction occurs, the indexer 408 may generate a branch prediction index using the branch instruction address information received from the program counter 212 (hereinafter "PC address") and thread tag information transmitted with the branch instructions from the instruction cache 208. The controller 404 may use the generated index to reference the branch history stored in the branch tables 228 and use the branch history to develop a branch prediction. If there is not an entry associated with the generated index, the controller 404 may create a new entry.

The branch indices, e.g., Br1 and Br2, may be generated according to a number of different branch indexing schemes. For example, each branch indexing scheme may combine a different combination of bits from the PC address and/or thread tag for use as the index.

It may be that some branch indexing schemes are better suited to uniquely identify relevant branch history for a branch instruction of a particular context (i.e., to prevent aliasing) than others for a given state of the computing system 100. The state of the computing system 100 may be, e.g., previous accuracy of the predictor, how many threads are active, a change in the number of active threads, where the active threads reside in memory 108, information about the threads themselves, RBRs, interrupt vectors, scheduling schemes, etc. Accordingly, in some embodiments the controller 404 may determine the state of the computing system 100 and dynamically select the branch indexing scheme for the indexer 408 to utilize in light of this determined state.

In some embodiments, the controller 404 may make a decision to use a new branch predictor whenever a thread is enabled/disabled, or when a receive buffer register (RBR) of a thread changes. The scheme may additionally/alternatively be reevaluated on a hardware context switch, a software context switch, and/or an external event. In some embodiments, the controller 404 may determine that when active threads reside in separate code spaces in the memory 108, a first branch indexing scheme using selective upper bits of the PC address may be sufficient to prevent aliasing. When active threads reside in the same code space, the controller 404 may determine that a second branch indexing scheme using selective lower bits of the PC address may prevent aliasing. When active threads share code sections (e.g., two threads share the same branch instructions), the controller 404 may determine that a third branch indexing scheme using a thread tag bit and selected bits (either upper or lower) of the PC address may be used to prevent aliasing. Different branch indexing schemes may be suitable for a wide variety of states of the computing system 100.

Figure 5:
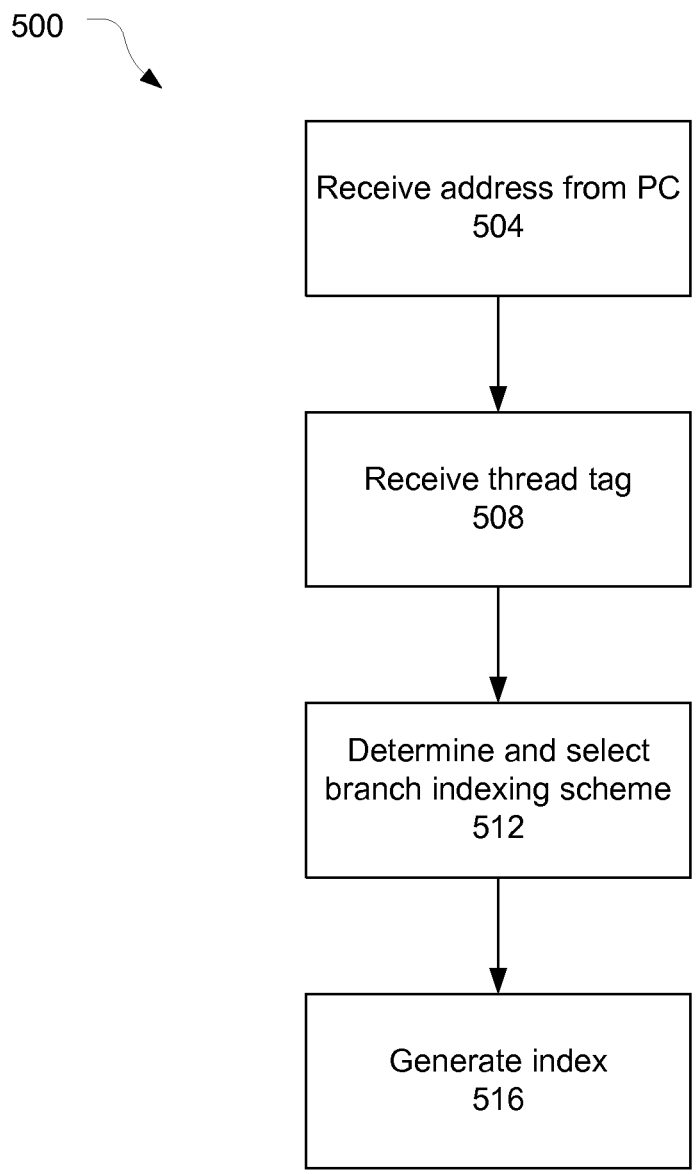
FIG. 5 is a flow diagram of a determinative branch prediction indexing, in accordance with at least one embodiment of the present invention.

FIG. 5 illustrates a flow diagram 500 depicting an indexing operation of the branch predictor 224 that may be done in accordance with various embodiments of the present invention. In block 504 the branch predictor 224 may receive an address of an executing (or soon to be executing) branch instruction from the program counter 212. In block 508 the branch predictor 224 may receive a thread tag from the instruction cache 208. The branch predictor 224, and in particular the controller 404, may determine which branch indexing scheme is likely to reduce the occurrence of aliasing given the state of the computing system 100 and select the determined scheme in block 512. The branch predictor 224, and in particular the indexer 408, may utilize the PC address and/or the thread tag to generate a branch prediction index given the selected branch index scheme in block 516.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
receiving (i) an address of a branch instruction from a program counter and (ii) a thread tag identifying a thread associated with the branch instruction;
determining whether a first active thread and a second active thread reside in (i) separate code spaces within a memory or (ii) a same code space within the memory, wherein one of the first active thread and the second active thread is the thread associated with the branch instruction, and
in response to the first active thread and the second active thread being determined to reside in separate code spaces within the memory, selecting a first branch indexing scheme from a plurality of branch indexing schemes, and
in response to the first active thread and the second active thread being determined to reside in a same code space within the memory, selecting a second branch indexing scheme from the plurality of branch indexing schemes,
wherein each branch indexing scheme of the plurality of branch indexing schemes indicates (i) a corresponding section of the address and (ii) a corresponding section of the thread tag; and
generating a branch prediction index based at least in part on selecting (i) a section of the address corresponding to the branch indexing scheme that is selected and (ii) a section of the thread tag corresponding to the branch indexing scheme that is selected.

2. The method of claim 1, wherein generating the branch prediction index comprises selecting one or more lower bits of the address.

3. The method of claim 2, wherein generating the branch prediction index comprises selecting one or more bits of the thread tag.

4. The method of claim 1, wherein generating the branch prediction index comprises selecting one or more upper bits of the address.

5. The method of claim 4, wherein generating the branch prediction index comprises selecting one or more bits of the thread tag.

6. The method of claim 1, further comprising:
determining a state of a host system on which the branch instruction is executing; and
based at least in part on the state of the host system that is determined, selecting the branch indexing scheme.

7. An apparatus comprising:
a program counter configured to store an address of a branch instruction;
an instruction cache configured to store a thread tag identifying a thread associated with the branch instruction; and
a branch predictor communicatively coupled to the program counter, wherein the branch predictor includes
a controller configured to determine whether a first active thread and a second active thread reside in (i) separate code spaces within a memory or (ii) a same code space within the memory, wherein one of the first active thread and the second active thread is the thread associated with the branch instruction, and wherein the controller is further configured to
in response to the first active thread and the second active thread being determined to reside in separate code spaces within the memory, select a first branch indexing scheme from a plurality of branch indexing schemes, and
in response to the first active thread and the second active thread being determined to reside in a same code space within the memory, select a second branch indexing scheme from the plurality of branch indexing schemes,
wherein each branch indexing scheme of the plurality of branch indexing schemes indicates (i) a corresponding section of the address and (ii) a corresponding section of the thread tag, and
an indexer coupled to the controller, wherein the indexer is configured to
receive the branch indexing scheme that is selected, and
generate a branch prediction index based at least in part on selecting (i) a section of the address corresponding to the branch indexing scheme that is selected, and (ii) a section of the thread tag corresponding to the branch indexing scheme that is selected.

8. The apparatus of claim 7, wherein the instruction cache is further configured to store the branch instruction.

9. The apparatus of claim 7, further comprising:
a branch prediction table configured to store the branch prediction index and branch history of the branch instruction.

10. The apparatus of claim 7, wherein the controller is further configured to determine a state of a host hosting the apparatus.

11. The apparatus of claim 10, wherein:
a plurality of threads, including the first active thread and the second active thread, are active; and
the controller is further configured to determine locations in memory where the plurality of threads reside and to determine the state of the host based at least in part upon the locations that are determined.

12. A system comprising:

a memory configured to store a plurality of threads including a thread associated with a branch instruction; and a processor coupled to the memory, wherein the processor is configured to execute the plurality of threads, and wherein the processor includes a program counter configured to store an address of the branch instruction, an instruction cache configured to store a thread tag identifying a thread associated with the branch instruction, and a branch predictor coupled to the program counter, wherein the branch predictor includes a controller configured to determine whether a first active thread of the plurality of threads and a second active thread of the plurality of threads reside in (i) separate code spaces within the memory or (ii) a same code space within the memory, wherein one of the first active thread and the second active thread is the thread associated with the branch instruction, and wherein the controller is further configured to in response to the first active thread and the second active thread being determined to reside in separate code spaces within the memory, select a first branch indexing scheme from a plurality of branch indexing schemes, and in response to the first active thread and the second active thread being determined to reside in a same code space within the memory, select a second branch indexing scheme from the plurality of branch indexing schemes, wherein each branch indexing scheme of the plurality of branch indexing schemes indicates (i) a corresponding section of the address and (ii) a corresponding section of the thread tag, and an indexer coupled to the controller, wherein the indexer is configured to receive the branch indexing scheme that is selected, and generate a branch prediction index based at least in part on selecting (i) a section of the address corresponding to the branch indexing scheme that is selected, and (ii) a section of the thread tag corresponding to the branch indexing scheme that is selected.

13. The system of claim 12, wherein the instruction cache is further configured to store the branch instruction.

14. The system of claim 12, wherein the controller is further configured to (i) determine a state of the system and (ii) select the branch indexing scheme based at least in part on the determined state of the system.

15. The system of claim 12, wherein the controller is further configured to (i) determine locations in memory where the plurality of threads are stored and (ii) determine the state of the system based at least in part upon the locations that are determined.

* * * * *